Patented Oct. 9, 1945

2,386,524

UNITED STATES PATENT OFFICE 2,386,524

PROCESS FOR THE MANUFACTURE OF ALUMINUM HALIDE CATALYSTS

Thomas H. Whaley, Jr., Bartlesville, Okla., assignor to Phillips Petroleum Company, a corporation of Delaware No Drawing. Application October 5, 1942, Serial No. 460,861

8 Claims. (Cl. 49—77)

The present invention relates to improved catalysts for use in hydrocarbon conversion processes. More particularly it relates to catalytic materials of improved form and to the method of preparation thereof.

In many hydrocarbon conversion processes, such as, for example, cracking, isomerization, alkylation, polymerization, Friedel and Crafts reactions, etc., catalysts are employed to accelerate the rate of reaction. Of the catalysts commonly employed in these reactions, aluminum chloride is of increasing importance. Aluminum chloride catalyst as generally used is in the form of a fine powder, which may be suspended in the hydrocarbons to form a slurry, or in the form of large lumps which are homogeneous or supported on a carrier material. Solid aluminum chloride is sometimes admixed with or deposited on Raschig rings or other inert forms to obtain a catalyst bed having sufficient permeability to allow flow of hydrocarbon liquids or vapors therethrough. The lumps of solid aluminum chloride are relatively impervious and are subject to coalescence or fusion into a compact mass of relatively poor catalytic activity. During the conversion process aluminum chloride forms a sludge or hydrocarbon complex. Thus, the particle size of the catalyst in lump form is constantly decreasing during the use of the catalyst. As the catalyst in admixture with inert solid material is converted to sludge, the sludge is deposited on the inert material, hindering the action of the catalyst. Powdered aluminum chloride is not well adapted for use in a stationary catalyst bed since a stationary mass of the powdered catalyst is relatively impervious and is subject to caking into a solid mass. When used as a suspension in the hydrocarbon reactants a serious corrosion and erosion problem is encountered. The aluminum chloride suspension in motion literally cuts the apparatus to pieces, resulting in very short equipment life. The corrosion and erosion is especially severe on agitators, pumps, valves and piping handling the suspension or slurry and on the catalyst cases at points of contact with moving aluminum chloride. Some difficulty is encountered also in retaining the powdered aluminum halide in suspension, the powder tending to collect and agglomerate in the equipment at places where there is insufficient flow or agitation to keep the particles separate and in suspension and to form cakes or lumps which are not readily resuspended.

It has been proposed heretofore to provide an active bed of aluminum chloride catalyst by subliming aluminum chloride upon a porous inert carrier. While the catalyst prepared in this manner is sometimes satisfactory when first put in use, it is subject to some extent to the objections set forth in regard to the use of aluminum chloride deposited on Raschig rings. In many cases, the catalysts formed in this manner soon show inferior activity due to the absorption of the sludge, formed particularly when aluminum chloride is used, on the porous catalyst carrier. A further disadvantage of these catalysts arises from the fact that some porous carriers, otherwise suited as catalyst carriers, promote undesirable reactions or adversely affect the desired hydrocarbon conversion.

The present invention provides an active aluminum halide catalyst in the form of fibres, filaments or threads that may be used in the form of bats or small pillows. Since the activity of solid catalytic materials is dependent, to a large extent, upon the surface area exposed to the reactants, the catalyst has much higher activity per unit of weight than solid aluminum chloride in lump form. The catalyst of my invention has an activity approaching that of powdered aluminum halides without the disadvantages attendant upon the use of the catalyst in powdered or finely divided state. The catalyst of my invention may be used in stationary catalyst beds allowing free flow of the reactants through the catalyst. The catalyst will remain substantially in place in the catalyst bed, thereby greatly reducing the corrosion to the equipment, especially that which is attributable to erosion. An important contribution to the art of catalytic conversion of hydrocarbons with an aluminum halide catalyst is made, therefore, by the present invention, which provides a solid hydrogen halide catalyst having a high degree of activity approaching that of powdered aluminum halide but capable of self support under many conversion conditions and being superior in many respects to the solid lump or powdered forms used heretofore.

An object of this invention is to provide an improved new catalytic material. Another object of this invention is to provide an improved aluminum halide catalyst. A further object of this invention is to provide a catalyst for use in those hydrocarbon conversion processes promoted by aluminum halides. A still further object of this invention is to provide such a catalyst in the form of fibres, filaments or threads. A still furthere object of this invention is to provide an improved self-supporting aluminum chloride catalyst. Other objects and advantages of my invention will be evident from the following detailed disclosure.

The aluminum halides are aluminum fluoride, M. P. 1040° C.; aluminum bromide, M. P. 97.5° C.; aluminum iodide, M. P. 191° C.; and aluminum chloride, which sublimes at 178° C. at atmospheric pressure but has a melting point of about 194° C. at 5.2 atmospheres pressure. Of these halides, the chloride, bromide, and iodide are preferred as catalytic materials for use in accordance with my invention. In practicing the process of my invention, the aluminum halide is rendered plastic, preferably by heating to a temperature in the region of its melting point or above under sufficient pressure to substantially preclude vaporization of the aluminum halide. The plastic or molten aluminum halide is then formed into strands or threads, referred to herein as fibres, of small diameter to yield a product similar in appearance to fibre glass, glass wool, rock wool, or mineral wool. These fibres may range from very small diameter to a diameter of about one-eighth of an inch, preferably the fibres have a diameter of 0.02 to 0.10 inch. In general the fibres may be formed in the manner of manufacture of glass wool or rock wool, certain precautions being necessary as will be described more fully hereinafter.

Because of the corrosive properties of molten aluminum chloride the vessel in which it is heated or fused should be made of or lined with a material resistant to corrosion by the aluminum chloride. Among the materials of construction which are generally suitable are alloys of iron containing high percentages of silicon or nickel; certain alloys of nickel, copper, and chromium, as well as other alloys containing high percentages of one or more of these metals; alloys of tungsten; certain cast bronzes; and deoxidized copper, preferably containing a small percentage of phosphorus. Most of these materials are preferably fabricated by casting to the desired shape. Corrosion-resistant linings of glass, resins, cement of highly siliceous material, tungsten, alundum, tungsten carbide, etc. may be used. Since the temperatures required to plasticize the preferred halides (the chloride, bromide, and iodide) are relatively moderate, the temperature resistances of the materials are not critical limiting factors in their selection. Moderate pressure is maintained on the molten aluminum halide to prevent excessive vaporization or subliming when heating the halide to plastic or molten state. A pressure of 50 to 150 pounds per square inch gauge is generally sufficient in the case of aluminum chloride; the aluminum bromide and iodide may be worked at substantially atmospheric pressure but preferably are maintained under superatmospheric pressure up to about 100 pounds per square inch gauge.

As a specific example of a method of preparing a fibrous or fibriform aluminum halide catalyst in accordance with my invention, anhydrous aluminum chloride is heated in a closed vessel to a temperature of 200° C. in the presence of an atmosphere of nitrogen. The molten aluminum chloride is admitted to a heated extrusion device of conventional design wherein mechanical pressure is applied to force the plastic aluminum chloride through an orifice of small diameter into a cooling chamber in which cooled nitrogen at a pressure of about 75 pounds per square inch gauge is continuously circulated. The orifice is particularly subject to the erosive action of the molten aluminum chloride and is suitably formed of tungsten carbide or alundum, which materials are extremely resistant to erosion. The fibre formed by extrusion through the orifice is rapidly cooled to solid condition by the relatively cold inert gas maintained under a pressure in excess of the vapor pressure of the aluminum chloride. The pressure in the cooling chamber precludes sublimation of the aluminum chloride and expansion of the plastic aluminum chloride to any appreciable extent. A compact fibre having good structural properties is thereby formed.

Hydrogen chloride may be employed as the inert gas and may be in some cases the preferred inert gases for cooling the aluminum chloride fibres since it acts as a activator for the catalyst. Similarly, the other hydrogen halides may be preferred as atmospheres in the manufacture of the aluminum bromide and aluminum iodide catalysts. While these gases may not be, strictly speaking, inert in the chemical sense, they do not, when properly correlated with the aluminum halide being treated, have a deleterious effect on the catalyst. Other gases which are not harmful to the catalyst may be employed, for example, hydrocarbon vapors, chlorine, hydrogen, and the rare gases. The gases brought into contact are in any case anhydrous and free from oxygen or other deleterious contaminants. Solution of gas in the molten aluminum chloride should be avoided as much as possible as the dissolved gases reduce the density of the fibre and may cause undesirable bubbles or pores in the fibre which seriously reduce its mechanical strength and stability. The expedient of cooling the fibre under pressure minimizes the tendency of bubble formation after the fibre is formed.

Aluminum bromide and aluminum iodide, both of which may be fused at atmospheric pressure, present less difficulty in fibre formation than does aluminum chloride and less tendency for the fibre to expand after formation. The fibres may be drawn from the molten aluminum halide directly from the liquid in an inert atmosphere. By this procedure a small piece of "bait" is dropped into the plastic aluminum halide and withdrawn therefrom. The bait is substantially inert to the aluminum halide, some of which adheres thereto and is withdrawn from the plastic mass. By drawing at a constant rate, depending upon the viscosity of the aluminum halide at its surface temperature and the rate of cooling, continuous fibres may be made.

Another method which may be employed in the manufacture of the fibrous aluminum halide catalysts of my invention is to allow the fluid aluminum halide to escape from the retort, i. e., the vessel in which it is heated, or from suitable associated apparatus, into an inert atmosphere through an outlet having a larger diameter than that of the desired finished fibre. The small stream of aluminum halide from the outlet is subjected to the action of gravity, tending to diminish the diameter of the stream, and at the same time it is subjected to continuously circulated, cooled inert gas. The circulating gas stream causes solidification of the aluminum halide into fibres and its action on the fibres tends to further draw the viscous stream to aid in forming a fibre of small diameter. The inert cooling atmosphere may be maintained at superatmospheric pressure, if desired, to insure the formation of a compact fibre. Mechanical drawing of the fibre may be employed to aid in reduction of the aluminum chloride stream to the fibre.

Another expedient which may be employed in forming the catalyst fibres involves the use of centrifugal force to cause the fluid aluminum halide to pass through suitable orifices into an inert cooling atmosphere. This principle is relatively well known and needs very little description. A batch of the aluminum halide in the molten state is revolved at a relatively rapid rate in apparatus provided with suitable outlets at the extreme points away from the center of rotation. Apparatus of this type may be employed to produce a fibre suitable for use as catalyst in accordance with my invention.

The fibres may conveniently be made into bats, similar to rock wool blankets, into bundles, or small wads of fibres; the bats and wads are familiar types of rock wool insulating materials. The bundles of fibres may take any suitable shape as, for example, the shape of shredded cereal biscuits, which forms are advantageous both from the standpoint of high structural strength and mechanical stability, and from the standpoint of ease of handling. After manufacture, the catalyst should be protected from contact with moisture, oxygen-containing gases, and other agents which are deleterious to the structure or activity of the catalyst prior to its use.

The aluminum halide catalyst in the fibrous form of my invention may be advantageously used in hydrocarbon conversion processes in which the aluminum halide may be maintained normally in solid form. The catalyst is capable of self-support when used under conditions of temperature below the softening or fusion point. In these operations a catalyst chamber is provided with means for support of the catalyst mass, either in its entirety or in sections. The catalyst chambers are generally provided with a foraminous plate to support the solid catalyst mass and may be provided at intervals with foraminous partitions which retain the catalyst while allowing free passage of the hydrocarbons therethrough. The catalyst case is filled with the fibrous catalyst and provision is made for removal of particles of the catalyst carried in the hydrocarbons as the fibres disintegrate with use. Fresh catalyst is added as needed to replenish the catalyst bed, the fresh catalyst being introduced preferably at the hydrocarbon outlet. The fresh catalytic material thereby acts as a filtering agent for short catalyst fibres, retaining them in the catalyst zone until spent. The fresh catalyst may be supplied to the catalyst chamber continuously or intermittently. Preferably the flow of hydrocarbons through the catalyst bed is upward over the catalyst. This allows any sludge formed in the reaction to separate from the catalyst at the point at which the sludge formation is generally greatest and prevents its deposition on the catalyst in the remainder of the catalyst bed.

In some catalytic processes in which the aluminum halides are used as catalysts, the aluminum halide is dissolved in the hydrocarbon reactants; in others the hydrocarbon is passed over aluminum halide prior to introduction of the hydrocarbon to the catalyst chamber to "saturate" the hydrocarbon with the aluminum halide. The catalytic material of my invention may be advantageously used by either of these procedures, the highly extended surface causing rapid solution of the aluminum halide to the extent of its solubility in the hydrocarbons, saturation being reached in short time. The fibrous aluminum halide used in this manner possesses the advantages over the lump or powdered form as previously pointed out.

As a less desirable modification of the method of use of the catalytic materials of my invention, short fibres may be suspended in the hydrocarbon stream in the catalytic reaction zone in much the same manner as powdered aluminum halides. While there is still the erosion problem mentioned in discussion of the powdered halide, the erosion is less severe than with the powdered halide. The fibres are more readily kept in suspension than is powder or small particles, and consequently less agitation, a factor in erosion, is required to maintain the suspension. The fibres may be readily separated from the suspension by filtering the hydrocarbons through glass wool or other suitable filter medium. The physical form of the aluminum halide fibres is believed to have a direct bearing upon the reduction of corrosion obtaining when the fibres are employed in suspension.

While I have described in detail catalysts of aluminum halide fibres and have disclosed various methods of making the catalyst of relatively pure aluminum halides, it is within the scope of my invention to use and manufacture fibrous aluminum halide catalysts in which non-metallic alloying materials are used. The alloying materials may be employed to increase the thermal and/or mechanical stability of the catalyst, or to enhance, modify, or retard its catalytic activity.

I claim:

1. The process of manufacture of a fibrous aluminum halide which comprises drawing a stream of a molten anhydrous aluminum halide from a molten mass thereof and cooling said stream to a solid fibre.

2. The process of a fibrous aluminum halide which comprises heating a mass of anhydrous aluminum halide to the plastic state, forming the plastic aluminum halide into a thread of relatively small diameter, and cooling said thread to a solid fibre.

3. A process according to claim 2 in which the aluminum halide is aluminum chloride.

4. The process of manufacture of aluminum halide fibres which comprises extruding from a fluid mass thereof anhydrous aluminum halide in a stream substantially the desired diameter of said fibre, and cooling said stream to a solid fibre.

5. The process of manufacture of aluminum chloride fibres which comprises heating anhydrous aluminum chloride under pressure to fusion, forming the molten aluminum chloride into a stream of substantially the desired fibre diameter in an atmosphere of inert gas under a pressure in excess of the vapor pressure of the aluminum chloride, and cooling said stream to a solid fibre.

6. The process of manufacture of aluminum halide fibres which comprises forming molten anhydrous aluminum halide from a molten mass thereof into a stream having substantially the desired fibre diameter in an atmosphere of an inert gas, and cooling said stream to a solid fibre.

7. The process of manufacture of aluminum halide fibres which comprises heating anhydrous aluminum halide under a pressure in excess of its vapor pressure to the molten state, forming a stream of the molten aluminum halide of small diameter substantially that of the desired fibre in an atmosphere of an inert gas at a pressure in excess of the vapor pressure of the aluminum halide, and cooling said stream to a solid fibre.

8. The process of manufacture of aluminum chloride fibres which comprises heating anhydrous aluminum chloride under a pressure in excess of its vapor pressure to the plastic state and forming a stream of the plastic aluminum chloride of small diameter substantially that of the desired fibre in an atmosphere of a cool inert gas at a pressure of approximately 75 pounds per square inch gauge.

THOMAS H. WHALEY, Jr.